United States Patent [19]

Ferris

[11] Patent Number: 4,829,829

[45] Date of Patent: * May 16, 1989

[54] AIR CONDITIONER TEST GAUGE WITH PRESSURE ZONE MARKINGS

[76] Inventor: James E. Ferris, 15 High Mesa Pl., Richardson, Tex. 75080

[*] Notice: The portion of the term of this patent subsequent to Jul. 15, 2003 has been disclaimed.

[21] Appl. No.: 223,298

[22] Filed: Jul. 22, 1988

Related U.S. Application Data

[63] Continuation of Ser. No. 26,293, Mar. 16, 1987, Pat. No. 4,770,044, which is a continuation-in-part of Ser. No. 873,386, Jun. 12, 1986, Pat. No. 4,693,112.

[51] Int. Cl.⁴ .............................................. G01L 7/16
[52] U.S. Cl. ..................... 73/744; 73/146.8; 137/227
[58] Field of Search ............... 73/146.8, 744; 137/227, 137/228, 229

[56] References Cited

U.S. PATENT DOCUMENTS

| | | | |
|---|---|---|---|
| 1,807,752 | 6/1931 | Poster | 73/146.8 |
| 2,049,532 | 8/1936 | Williams | 73/744 |
| 3,230,968 | 1/1966 | Struby | 137/227 |
| 4,599,903 | 7/1986 | Ferris | 73/146.8 |
| 4,770,044 | 9/1988 | Ferris | 73/744 |

*Primary Examiner*—Donald O. Woodiel
*Attorney, Agent, or Firm*—Hubbard, Thurman, Turner & Tucker

[57] ABSTRACT

A refrigerant system gas pressure check gauge with a valve head opening having a valve pin and shaped to fit on and over the low pressure suction side valve fitting of a refrigeration system, auto or home, with colored zones and safety markings with worded indications including safety danger warnings. The colored zones and safety markings directly match precise pressure zones on the valve stem.

10 Claims, 3 Drawing Sheets

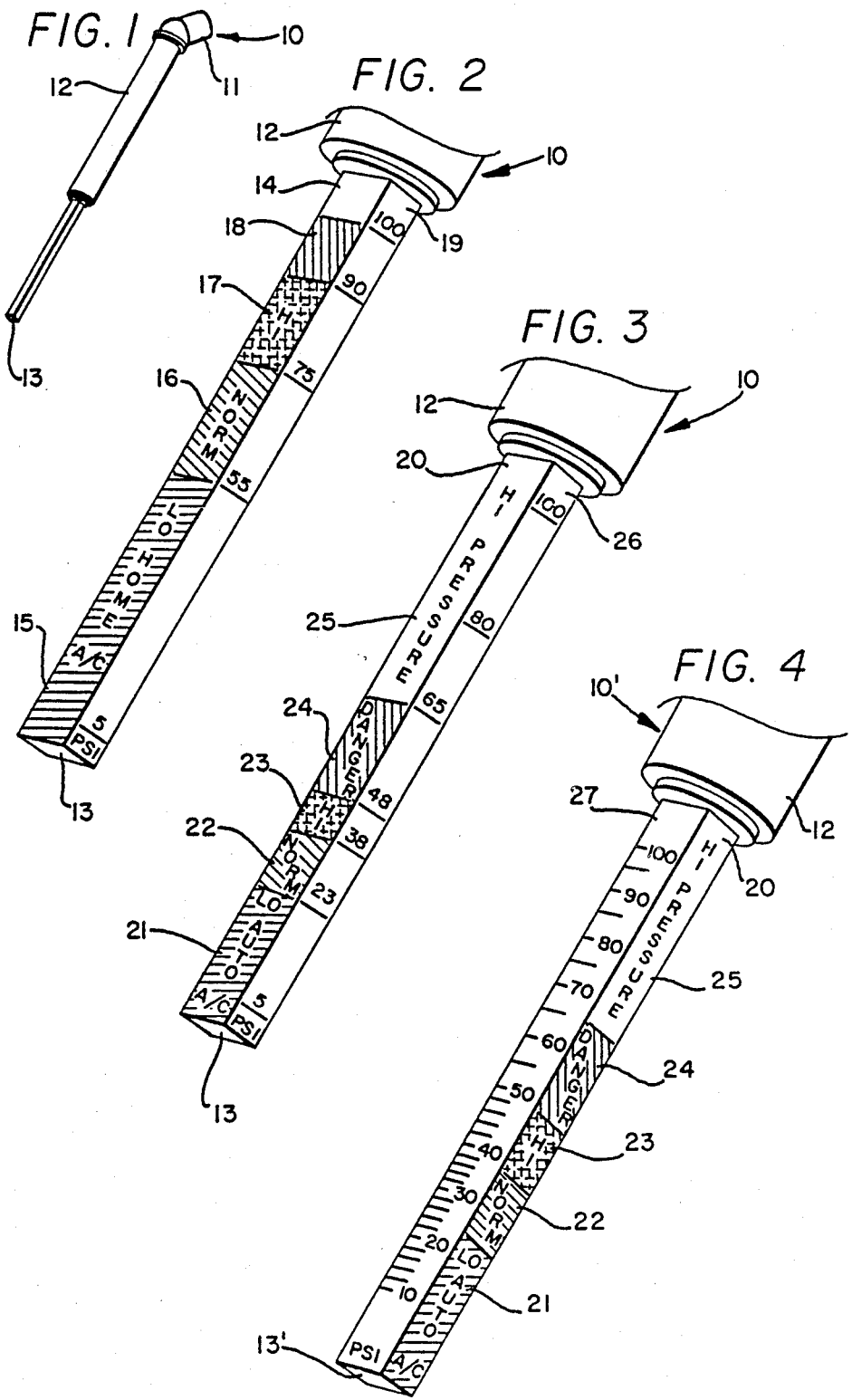

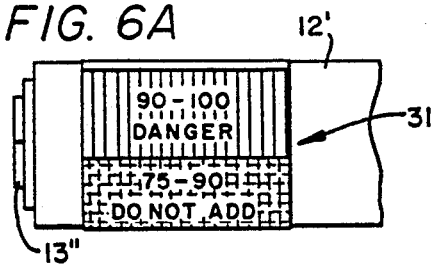
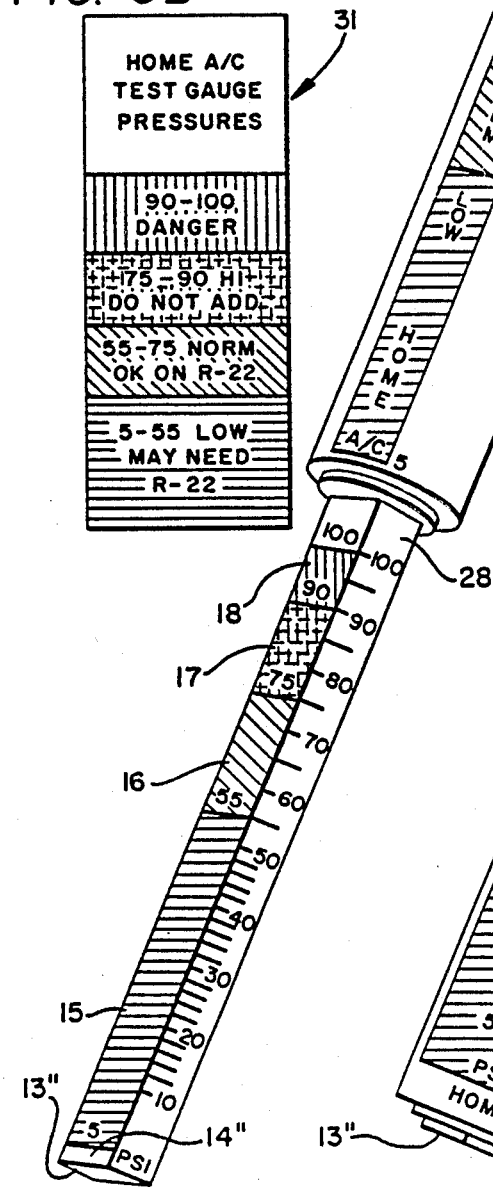
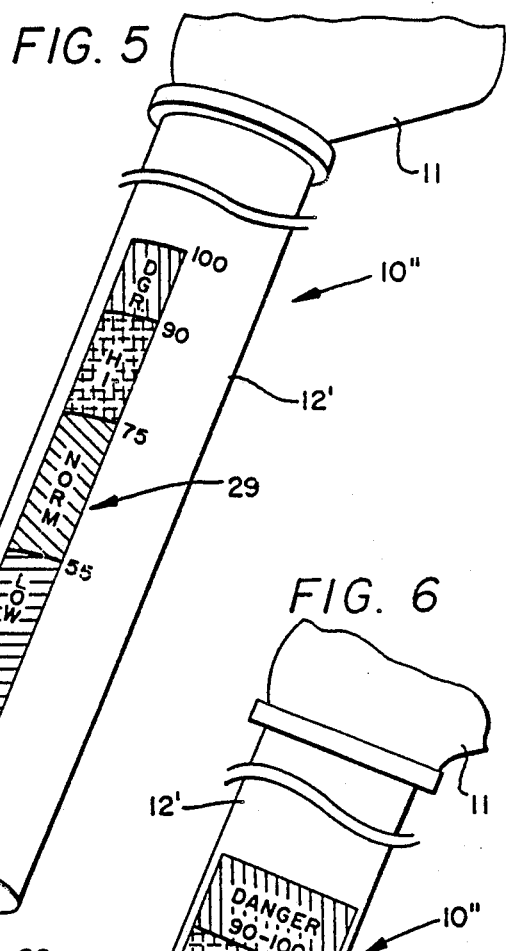
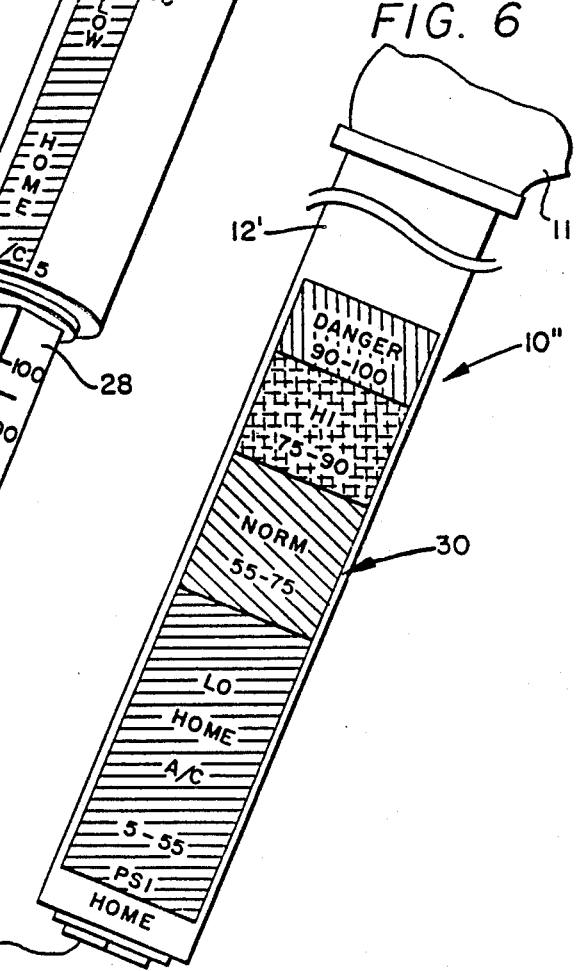

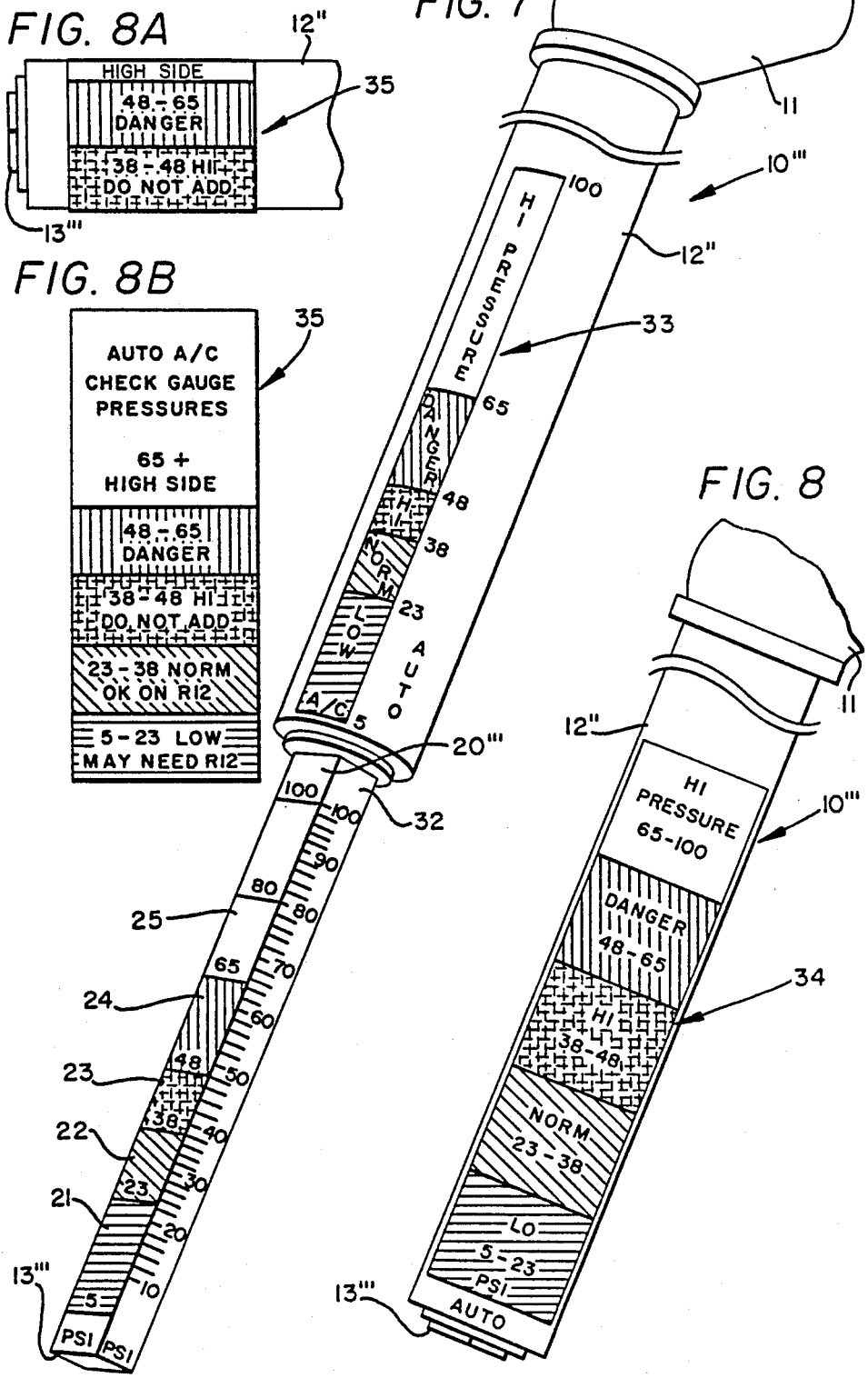

AIR CONDITIONER TEST GAUGE WITH PRESSURE ZONE MARKINGS

This application is a continuation of my copending U.S. application Ser. No. 026,293 filed on Mar. 16, 1987, now U.S. Pat. No. 4,770,044, which was a continuation-in-part of my U.S. application Ser. No. 873,386 filed on June 12, 1986, now U.S Pat. No. 4,693,112.

This invention relates in general to refrigerant system fluid- gas pressure checking gauges, and more particularly, to an air conditioning test gauge with pressure zone markings directly matching precise pressure zones on the valve stem.

Heretofore, special and expensive tools and equipment have been needed to check the refrigerant level pressure in car air conditioning systems and other air conditioning systems. Use of such equipment can be awkward and demanding, requiring skill, experience and more knowledge than most people have on the subject. Any improvement in checking the refrigerant pressure level in both auto and home air conditioners and indication of when and how must refrigerant material to add is most welcome. This improvement is a pressure gauge like a tire pressure gauge equipped with a valve head that is shaped to fit on and over the low pressure side valve fitting of a refrigeration system and a valve stem with precise pressure zones that match colored zones and safety markings with worded indications including safety danger warnings. This makes use of the gauge much more convenient than heretofore in checking air conditioning systems with pressure zone indication more positively and conveniently available with and on the gauge itself. This eliminates separate printed pressure zone tables to interpret gauge pressure readings and having to independently distinguish between auto and home air conditioning system while pressure checking such systems.

Printed pressure zone tables in gauge packaging are discarded many times when gauges are unpackaged and even when saved have a tendency to become lost or misplaced and not available when needed.

It is therefore a principal object of this invention to provide for easy, quick, safe pressure checking of air conditioner refrigerant systems with an easy to use, easy to read and interpret pressure checking gauge.

Another object is to eliminate any need for expensive, complicated and hard to use refrigerant hose and dial gauge equipment for pressure checking.

A further object is to provide an air conditioner refrigerant pressure check gauge with pressure zone markings directly matching precise pressure zones on the valve stem for users convenience.

Still another object with such a gauge is to eliminate any need for separate printed zone tables and the hazard of table loss or misplacement.

Features of the invention useful in accomplishing the above objects include, in an air conditioner test gauge with pressure zone markings, a gas pressure check gauge with a valve stem with precise pressure zones that match colored zones and safety markings with worded indications including safety danger warnings. The gauge has a multi-sided indicator stem having at least one side indicating pressure zones low, norm, hi, danger and hi-pressure that are color coded as well. At least one side of the indicator stem is pressure numbered to indicate gas pressure.

Specific embodiments representing what are presently regarded as the best mode of carrying out the invention are illustrated in the accompanying drawings.

In the drawings:

FIG. 1 represents a perspective view of an air conditioner refrigerant gas pressure check gauge with a rectangular indicator stem having pressure zone indications;

FIG. 2 a partial enlarged perspective view of the gauge stem of FIG. 1 showing home gauge zones color matched in zones LO in blue, NORM in green, HI in yellow, and then a red zone with zone limit PSI markings 55, 75, 90 and 100 on an adjacent face of the gauge stem;

FIG. 3, a partial enlarged perspective view of the gauge stem of FIG. 1 turned around to show the auto air conditioning faces of the gauge stem with on one stem face zones color hatched—LO in blue, NORM in green, HI in yellow, DANGER in red and then HI PRESSURE in white with on a clockwise adjoining stem face PSI zone matching markings, 23, 38, 48, 65 and 100;

FIG. 4, a partial enlarged perspective view of a gauge stem as modified from the gauge stem of FIGS. 2 and 3 retaining the auto use sides of FIG. 3 but including a straight PSI indicator stem side for use of the gauge as a tire pressure checking gauge adaption;

FIG. 5, a partial enlarged perspective view of an air conditioner gas pressure check gauge with a rectangular indicator stem with home gauge zones color hatched LO in blue, NORM in green, HI in yellow, and then a red danger zone, with zone limit PSI markings among gradation markings from 10 to 100 PSI on a side of the stem, and a color coded and zone pressure printing with wordage extended along the enclosure body of the gauge;

FIG. 6 a partial enlarged perspective of a home A/C gauge with a modified color coded and zone pressure printing with wordage extended along the gauge enclosure body;

FIG. 6A, a partial enlarged view of a gauge enclosure body with a home A/C color coded and zone pressure printing with wordage extended around the gauge enclosure body;

FIG. 6B, a flattened out showing of the wrap around color coded and zone pressure printing with wordage of FIG. 6A;

FIG. 7, a partial enlarged perspective view of an auto air conditioner refrigerant gas pressure check gauge with a rectangular indicator stem with auto gauge zones color hatched LO in blue, NORM in green, HI in yellow, DANGER in red, and a HI PRESSURE zone at the top in white with zone limit PSI markings, and gradation markings from 10 to 100 PSI on a side of the stem, and a color coded and zone pressure printing with wordage extended along the enclosure body of the gauge;

FIG. 8, a partial enlarged perspective of an auto A/C gauge with a modified color coded and zone pressure printing with wordage extended along the gauge enclosure body;

FIG. 8A a partial enlarged body with an auto A/C color coded and zone pressure printing with wordage extended around the gauge enclosure body;

FIG. 8B a flattened out showing of the wrap around color coded and zone pressure printing with wordage of FIG. 8A.

Referring to the drawings:

The universal air conditioner refrigerant pressure gauge 10 of FIG. 1 is shown to have a valve head 11, a valve body 12, and a rectangular gauge stem 13 that is moveable outward from the valve body 12 to various degrees dependent on pressure input to the valve head 11 when it is pressed on a gas pressure valve fitting. Referring also to FIGS. 2 and 3 the rectangular gauge stem 13 is shown in FIG. 2 to have a home A/C gauge zoned side 14 including LO zone 15 in blue, NORM zone 16 in green, HI zone 17 in yellow, and then a red zone 18, with PSI markings 55, 75, 90 and 100 aligned with respective zone upper pressure limits on adjacent face 19 of the gauge stem 13. The rectangular gauge stem 13 is shown in FIG. 3 to have an auto A/C gauge zoned side face 20 including LO zone 21 in blue, NORM zone 22 in green, HI zone 23 in yellow, DANGER zone 24 in red, and then a HI PRESSURE zone 25 in white, with PSI markings 23, 38, 48, 65 and 100 aligned with respective zone upper pressure limits on adjacent face 26 of the gauge stem 13.

With the air conditioner refrigerant pressure gauge 10' embodiment of FIG. 4 the gauge stem 13' in addition to having an auto A/C gauge zoned side face 20 that is accompanied with PSI marked face with PSI markings 23, 3,, 48, 65 and 100 aligned with respective zone upper pressure limits on an adjacent face, such as stem face 6 in FIG. 3, a straight PSI indicator stem face 27 is provided. The straight PSI indicator stem face 27 is provided for use of the gauge as a tire pressure checking gauge in addition to use as an auto air conditioner check gauge. It should also be noted that the specific PSI markings shown on stem face 26 in FIG. 3 could be superimposed on the otherwise straight PSI indicator stem face 27 of FIG. 4.

The home air conditioner gas pressure check gauge 10" of FIG. 5 has valve head 11, a valve body 12' and a rectangular gauge stem 13" with a home A/C gauge zone side 14". These A/C zones include LO zone 15 in blue, NORM zone 16 in green, HI zone 17 in yellow and then a red zone 18 with a standard PSI marking side with zone limit PSI marking among gradation markings from 10 to 100 PSI on stem side 28. In addition a corresponding zone color coded and zone pressure limit printing 29 with wordage is extended along the valve enclosure body 12' for reference convenience with specific zone limits 55, 75, 90 and 100 printed in alignment with color zone limits.

The home A/C gauge 10" of FIG. 6 is the same as that of FIG. 5 except for the modified color coded zone pressure printing with wordage extended along the valve body 12' and with zone PSI ranges printed within each color coded zone.

With the gauge embodiment of FIGS. 6A and 6B the gauge enclosure body 12' is provided with a wrap around home A/C color coded and zone pressure printing 31 with wordage and zone PSI ranges printed thereon. This may take the form of an adhesive backed printed form 31 shown in the flattened out state in FIG. 6B that is wrapped around in place on gauge body 12'.

The auto air conditioner gas pressure check gauge 10" of FIG. 7 has valve head 11, a valve body 12" and a rectangular gauge stem 13" with an auto A/C gauge zone side 20". These A/C zones include LO zone 21 in blue, NORM zone 22 in green, HI zone in yellow, DANGER zone 24 in red, and then a HI PRESSURE zone 25 in white with a standard PSI marking side with gradation markings from 10 to 100 PSI on stem side 32. In addition a corresponding zone color coded and zone pressure limit printing 33 with wordage is extended along the valve gauge enclosure body 12" for reference convenience with specific PSI limits 23, 38, 48, 65 and 100 printed in alignment with color zone limits.

The auto A/C gauge 10" of FIG. 8 is the same as that of FIG. 7 except for the modified color coded zone pressure printing 34 with wordage extended along the valve body 12" with zone PSI ranges printed within each color coded zone.

With the auto A/C gauge embodiment of FIGS. 8A and 8B the gauge enclosure body 12" is provided with a wrap around auto A/C color coded and zone pressure printing 35 with wordage and zone PSI ranges printed thereon. This may take the form of an adhesive backed printed form 35 shown in the flattened out state in FIG. 8B that is wrapped around in place on gauge body 12".

Whereas this invention has been described particularly with respect to several embodiments thereof, it should be realized that various changes may be made without departure from the essential contributions to the art made by the teachings hereof.

I claim:

1. Pressure measuring apparatus comprising:
    a housing having an inlet communicating with the interior of said housing and adapted to receive a pressurized fluid;
    a pressure indicating member internally carried by said housing for movement relative thereto between a retracted position and an outwardly projecting, extended position to which said pressure indicating member may be driven by pressurized fluid received in said housing interior through said inlet, the length of fluid pressure—caused extension of said pressure indicating member from its retracted position being indicative of the pressure of fluid received in said housing interior through said inlet; and
    pressure indicia means for providing both quantitative and qualitative visual indications of the pressure of fluid received in said housing interior through said inlet, said pressure indicia means including:
    numbered pressure scale markings positioned on said pressure indicating member and correlated to its extension length relative to said housing,
    boundary markings defining a plurality of pressure zones,
    verbal indicia positioned in said plurality of pressure zones and qualitatively characterizing pressures within the limits thereof, and
    means for interrelating said pressure scale markings and said pressure zone boundary markings in an aligned manner such that a quantitative pressure reading may be rapidly and visually converted to a qualitative pressure reading using said boundary markings and verbal indicia.

2. The pressure measuring apparatus of claim 1 wherein:
    said pressure zones are positioned on said pressure indicating member and operatively aligned with said numbered pressure scale markings to provide for ready visual comparison between a given numbered pressure scale marking and its corresponding pressure zone.

3. The pressure measuring apparatus of claim 2 wherein:

said pressure indicating member has a rectangular cross-section and contiguous, mutually angled first and second side surfaces, said numbered pressure scale markings are positioned on said first side surface, and said boundary markings are positioned on said second side surface.

4. The pressure measuring apparatus of claim wherein:

said boundary markings comprise a plurality of contiguous, mutually differently colored areas which define said plurality of pressure zones.

5. The pressure measuring apparatus of claim 4 wherein:

said plurality of pressure zone are positioned on said pressure indicating member and operatively aligned with said numbered pressure scale markings to provide for ready visual comparison between a given number pressure scale marking and its corresponding pressure zone.

6. A pressure check gauge comprising:

a housing having an inlet communicating with the interior of said housing and adapted to receive a pressurized fluid;

an elongated pressure indicating member internally carried by said housing for longitudinal movement relative thereto between a retracted position and an outwardly projecting, extended position to which said pressure indicating member may be rriven by pressurized fluid received in said housing interior through said inlet, the length of fluid pressure-caused extension of said pressure indicating member from its retracted position being indicative of the pressure of fluid received in said housing interior through said inlet, said pressure indicating member having first and second outer side surface portions extending along its length;

a longitudinally extending series of numbered pressure scale markings positioned on said first side surface portion of said pressure indicating member and correlated to the extension length of said pressure indicating member relative to said housing;

boundary markings positioned on said second side surface portion of said pressure indicating member and defining a longitudinally extending plurality of pressure indicia zones longitudinally aligned and correlated with said numbered pressure scale markings in a predetermined manner; and verbal indicia positioned in said plurality of pressure indicia zones and qualitatively characterizing longitudinal ranges of said numbered pressure scale markings that are longitudinally aligned with said pressure indicia zones.

7. The pressure check gauge of claim 6 wherein said boundary markings comprise mutually differently colored areas formed on said second side surface portion of said pressure indicating member and defining said pressure indicia zones.

8. The pressure check gauge of claim 6 wherein:

said pressure indicating member has, along its length, a rectangular cross-section, and said first and second side surface portions of said pressure indicating member are laterally contiguous, mutually angled side surface portions thereof.

9. The pressure check gauge of claim 6 wherein:

said pressure indicating member has, along its length, a rectangular cross-section defined by first and second opposite side surfaces and third and fourth opposite side surfaces, said numbered pressure scale markings are positioned on each of said first and second opposite side surfaces, and said boundary markings and said verbal indicia are positioned on at least one of said third and fourth opposite side surfaces.

10. A pressure check gauge comprising:

a housing having an inlet communicating with the interior of said housing and adapted to receive a pressurized fluid;

a pressure indicating member internally carried by said housing for movement relative thereto between a retracted position and an outwardly projecting, extended position to which said pressure indicating member may be driven by pressurized fluid received in said housing interior through said inlet, the length of fluid pressure—caused extension of said pressure indicating member from its retracted position being indicative of the pressure of fluid received in said housing interior through said inlet;

numbered pressure scale markings positioned on said pressure indicating member and correlated to its extension length relative to said housing; and interpretive means, carried by one of said housing and said pressure indicating member and including interpretive verbal markings, to which a numerical pressure reading observed from said numbered pressure scale markings may be visually compared to readily assess the desirability of the observed numerical pressure reading.

* * * * *